US010876996B2

(12) United States Patent
Tanaka et al.

(10) Patent No.: US 10,876,996 B2
(45) Date of Patent: Dec. 29, 2020

(54) METHOD OF MANUFACTURING GAS SENSOR AND METHOD OF REMOVING OIL

(71) Applicant: NGK INSULATORS, LTD., Nagoya (JP)

(72) Inventors: Hiroyuki Tanaka, Nagoya (JP); Koji Egawa, Nagoya (JP); Kenji Isaka, Nagoya (JP); Yutaka Nakane, Okazaki (JP)

(73) Assignee: NGK INSULATORS, LTD., Nagoya (JP)

( * ) Notice: Subject to any disclaimer, the term of this patent is extended or adjusted under 35 U.S.C. 154(b) by 216 days.

(21) Appl. No.: 15/916,310

(22) Filed: Mar. 9, 2018

(65) Prior Publication Data

US 2018/0266982 A1 Sep. 20, 2018

(30) Foreign Application Priority Data

Mar. 17, 2017 (JP) .................................. 2017-053163

(51) Int. Cl.
*G01N 27/409* (2006.01)
*G01N 27/407* (2006.01)
*G01N 27/419* (2006.01)

(52) U.S. Cl.
CPC ......... *G01N 27/409* (2013.01); *G01N 27/407* (2013.01); *G01N 27/4071* (2013.01); *G01N 27/419* (2013.01); *F01N 2560/02* (2013.01)

(58) Field of Classification Search
CPC ............ G01N 27/409; G01N 27/4071; G01N 27/419; G01N 27/407
USPC .................. 123/190.6, 568.29, 572; 219/622
See application file for complete search history.

(56) References Cited

U.S. PATENT DOCUMENTS

2010/0225339 A1 9/2010 Fujita et al.

FOREIGN PATENT DOCUMENTS

JP 2016-053498 A 4/2016

OTHER PUBLICATIONS

Extended European Search Report received in corresponding European Application No. 18000250.3 dated Aug. 20, 2018.

*Primary Examiner* — Thien S Tran
(74) *Attorney, Agent, or Firm* — Mattingly & Malur, PC

(57) ABSTRACT

A method of manufacturing a gas sensor includes a step of preparing an assembly including a sensor element, a metal cylindrical body through which the sensor element penetrates in an axial direction, and a protection cover that is attached to the cylindrical body and that covers one end side of the sensor element. The method also includes steps of arranging a coil in a periphery of at least a portion of the cylindrical body at the same side as the other end of the sensor element with respect to the protection cover to avoid the protection cover of the assembly, induction heating the portion of the cylindrical body where the coil is arranged in the periphery by applying current to the coil, and hence removing oil adhering to the portion.

7 Claims, 6 Drawing Sheets

METHOD OF MANUFACTURING GAS SENSOR AND METHOD OF REMOVING OIL

BACKGROUND OF THE INVENTION

1. Field of the Invention

The present invention relates to a method of manufacturing a gas sensor and a method of removing oil.

2. Description of the Related Art

Hitherto, there is known, as a gas sensor that detects a specific gas concentration in a measurement-object gas, a structure including a gas sensor element, a cylindrical main metal fitting having a flange portion that surrounds the periphery of the gas sensor element and protrudes outward in the radial direction, and a cylindrical protector fixed to the main metal fitting (for example, see PTL 1). PTL 1 describes that, when the gas sensor is manufactured, a coil is arranged to surround a portion at a distal end side with respect to a proximal end of the flange portion and to surround the periphery of the protector, and oil adhering to the main metal fitting and the protector is removed by induction heating by applying current to the coil.

CITATION LIST

Patent Literature

PTL 1: Japanese Unexamined Patent Application

SUMMARY OF THE INVENTION

However, if the induction heating is performed by the method described in PTL 1, the protector, that is, a protection cover of the sensor element may be blackened. If the protection cover is blackened, the protection cover likely absorbs radiant heat. The time required for raising the temperature at the start of use of the sensor element may be increased, and the responsiveness at the start of use of the sensor element may be decreased.

The present invention is made to address the problems, and a main object of the invention is to remove oil and to suppress blackening of a protection cover.

The present invention employs the following measures to attain the above-described main object.

A method of manufacturing a gas sensor according to the present invention includes:

(a) a step of preparing an assembly including a sensor element that has a measurement gas inlet for introducing a measurement-object gas at one end side of the sensor element and that detects a specific gas concentration in the introduced measurement-object gas, a metal cylindrical body through which the sensor element penetrates in an axial direction, and a protection cover that is attached to the cylindrical body and that covers the one end side of the sensor element; and (b) a step of arranging a coil in a periphery of at least a portion of the cylindrical body at the same side as the other end of the sensor element with respect to the protection cover to avoid the protection cover of the assembly, induction heating the portion of the cylindrical body where the coil is arranged in the periphery by applying current to the coil, and hence removing oil adhering to the portion.

With the manufacturing method, when the assembly is induction heated, the coil is arranged in the periphery of at least the portion of the cylindrical body at the other end side of the sensor element with respect to the protection cover to avoid the protection cover that covers the one end side of the sensor element. Then, the portion of the cylindrical body where the coil is arranged in the periphery is induction heated by applying current to the coil. Hence, the oil of the portion of the cylindrical body where the coil is arranged in the periphery can be removed, and blackening of the protection cover can be suppressed because the coil is not arranged in the periphery of the protection cover and hence the protection cover is unlikely induction heated.

In this case, the sensor element may include a multilayer body in which a plurality of oxygen-ion-conductive solid electrolyte layers are stacked, a detector that detects a specific gas concentration in the measurement-object gas introduced through the measurement gas inlet, and a heater that heats the multilayer body.

In the method of manufacturing the gas sensor according to the present invention, the sensor element may have a reference gas inlet through which a reference gas is introduced at the other end side of the sensor element, the reference gas serving as a reference for the detection of the specific gas concentration; the cylindrical body may include a main metal fitting and an inner cylinder, the protection cover being attached to the main metal fitting at the same side as the one end of the sensor element, the inner cylinder being attached to the main metal fitting at the same side as the other end of the sensor element; and, in the step (b), the coil may be arranged in a periphery of a portion of the cylindrical body including at least the inner cylinder. In this case, in the gas sensor, if oil adheres to the inner cylinder of the cylindrical body located at the other end side of the sensor element with respect to the main metal fitting, that is, at the side near the reference gas inlet, gasified oil reaches the reference gas inlet and likely decreases detection accuracy for the specific gas concentration. With this manufacturing method, since the coil is arranged in the periphery of the portion of the cylindrical body including at least the inner cylinder and the induction heating is performed, the oil of at least the inner cylinder of the cylindrical body can be removed. Accordingly, the decrease in the detection accuracy due to the oil adhering to the inner cylinder can be suppressed. In this case, "the coil is arranged in the periphery of the portion of the cylindrical body including at least the inner cylinder" includes a case where the coil is not arranged in a periphery of a small portion of the inner cylinder as far as the above-described advantageous effects can be obtained.

In the method of manufacturing the gas sensor according to the present invention, in the step (b), the coil may be arranged in a periphery of an entirety of the cylindrical body at the same side as the other end of the sensor element with respect to the protection cover. Accordingly, a large portion as possible of the cylindrical body can be induction heated while the protection cover is avoided, and oil adhering to the cylindrical body is likely removed. In this case, "the coil is arranged in the periphery of the entirety of the cylindrical body at the other end side of the sensor element with respect to the protection cover" includes a case where the coil is not arranged in a periphery of a small portion of the cylindrical body at the other end side of the sensor element with respect to the protection cover as far as the above-described advantageous effects can be obtained.

In the method of manufacturing the gas sensor according to the present invention, in the step (b), the portion of the cylindrical body where the coil is arranged in the periphery may be heated at 420° C. or higher. Accordingly, the oil of the portion of the cylindrical body where the coil is arranged in the periphery can be further reliably removed. In this case, in the step (b), the portion of the cylindrical body where the coil is arranged in the periphery may be heated at 600° C. or higher.

In the method of manufacturing the gas sensor according to the present invention, the assembly may include a sealant containing talc and arranged between an inner peripheral surface of the cylindrical body and the sensor element; and, in the step (b), the induction heating may be performed so that a temperature of the sealant is set so as not to exceed 650° C. Accordingly, if the talc is contained in the sealant, deterioration of the talc due to the induction heating can be suppressed.

In the method of manufacturing the gas sensor according to the present invention, the assembly may include a ceramic member arranged between the inner peripheral surface of the cylindrical body and the sensor element; and, in the step (b), a temperature of the portion of the cylindrical body where the coil is arranged in the periphery may be raised to 400° C. or higher, and a temperature rise rate when the temperature of the portion is 400° C. or higher may be set so as not to exceed 27.5° C./second. Accordingly, generation of a crack in the ceramic member can be suppressed.

In the method of manufacturing the gas sensor according to the present invention, the assembly may include the ceramic member arranged between the inner peripheral surface of the cylindrical body and the sensor element; and, in the step (b), the temperature of the portion of the cylindrical body where the coil is arranged in the periphery may be raised to 600° C. or higher, and a temperature rise rate when the temperature of the portion is in a range from 400° C. or higher to 600° C. or lower may be set so as not to exceed 27.5° C./second. Accordingly, generation of a crack in the ceramic member can be suppressed.

A method of removing oil according to the present invention is a method of removing oil adhering to an assembly including a sensor element that has a measurement gas inlet for introducing a measurement-object gas at one end side of the sensor element and that detects a specific gas concentration in the introduced measurement-object gas, a metal cylindrical body through which the sensor element penetrates in an axial direction, and a protection cover that is attached to the cylindrical body and that covers the one end side of the sensor element, the method including:

a step of arranging a coil in a periphery of at least a portion of the cylindrical body at the other end side of the sensor element with respect to the protection cover to avoid the protection cover of the assembly, induction heating the portion of the cylindrical body where the coil is arranged in the periphery by applying current to the coil, and hence removing oil adhering to the portion.

With the method of removing the oil, similarly to the above-described method of manufacturing the gas sensor, the oil of the portion of the cylindrical body where the coil is arranged in the periphery is removed, and blackening of the protection cover can be suppressed because the coil is not arranged in the periphery of the protection cover and hence the protection cover is unlikely induction heated. The method of removing the oil can employ any of the aforementioned various aspects of the method of manufacturing the gas sensor.

DETAILED DESCRIPTION OF THE INVENTION

Figure 1:
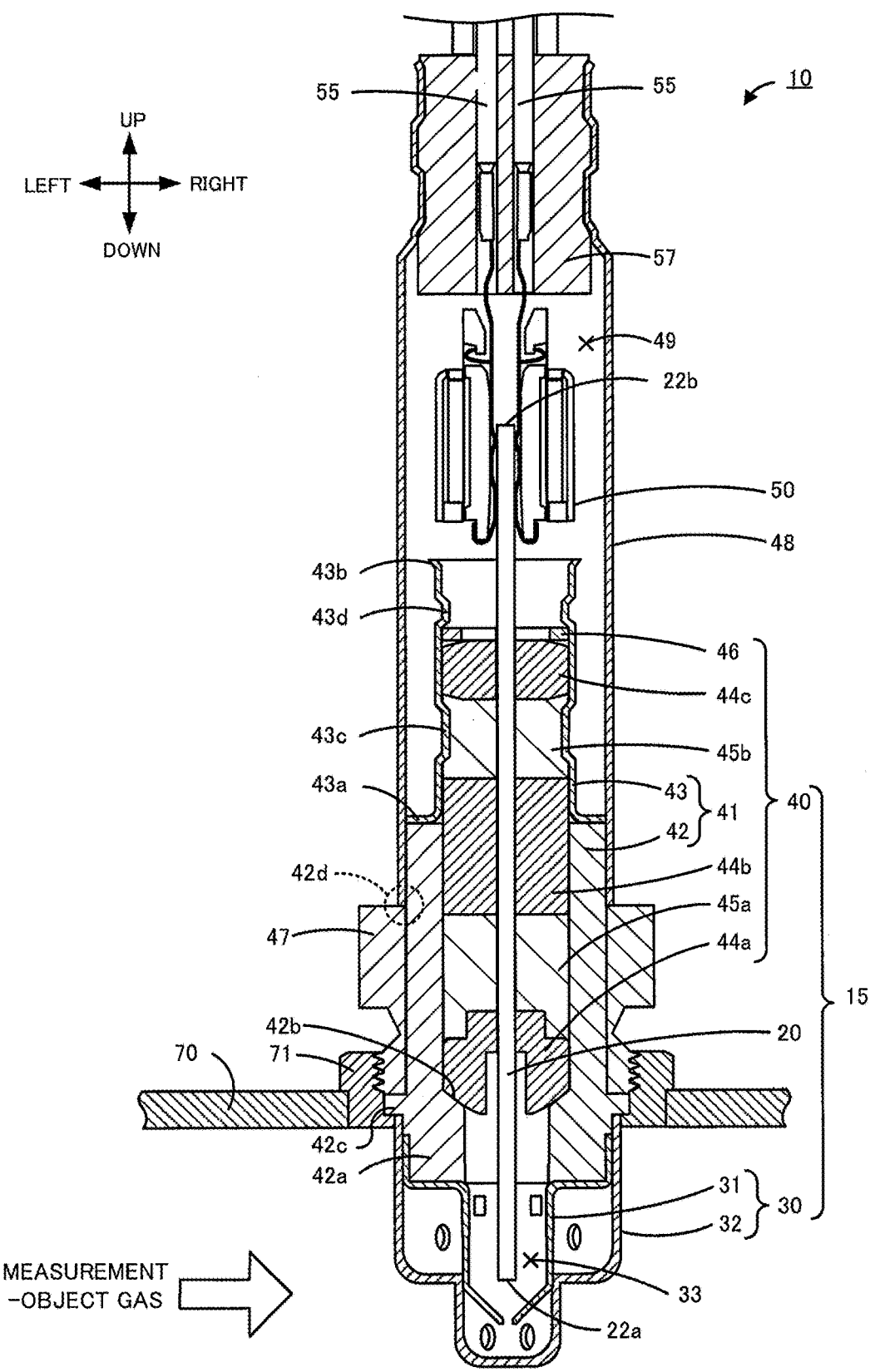
FIG. 1 is a vertical section view illustrating a state in which a gas sensor 10 is attached to a pipe 70.
Figure 2:
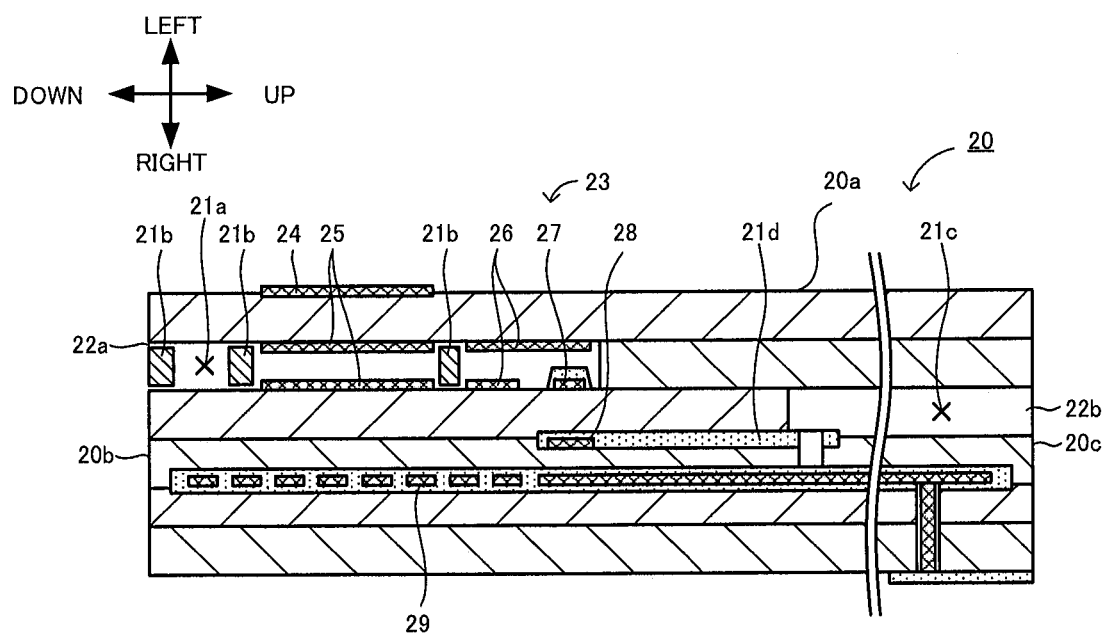
FIG. 2 is a brief section view of a section taken in up-down and left-right directions of a sensor element 20.

An embodiment of the present invention is described below with reference to the drawings. FIG. 1 is a vertical section view illustrating a state in which a gas sensor 10 according to an embodiment of the present invention is attached to a pipe 70. FIG. 2 is a brief section view of a section taken in up-down and left-right directions of a sensor element 20. In this embodiment, as illustrated in FIG. 1, it is assumed that the longitudinal direction of the gas sensor 10 is the up-down direction, and the direction perpendicular to the longitudinal direction is the left-right direction.

As illustrated in FIG. 1, the gas sensor 10 includes an assembly 15, a nut 47, an outer cylinder 48, a connector 50, a lead wire 55, and a rubber cap 57. The assembly 15 includes a sensor element 20, a protection cover 30, and an element sealing body 40. The gas sensor 10 is attached to, for example, a pipe 70, such as an exhaust gas pipe of a vehicle, and is used for measuring the concentration of a specific gas (specific gas concentration), such as NOx or $O_2$, contained in an exhaust gas serving as a measurement-object gas. In this embodiment, the gas sensor 10 measures an NOx concentration as the specific gas concentration.

As illustrated in FIG. 2, the sensor element 20 includes a multilayer body 20a in which a plurality of oxygen-ion-conductive solid electrolyte layers (six layers in FIG. 2) of, for example, zirconia ($ZrO_2$) are stacked, a detector 23, and a heater 29. The multilayer body 20a has a long plate shape (rectangular-parallelepiped shape), and has a distal end surface 20b at a lower end side (left side in FIG. 2), and a proximal end surface 20c at an upper end side (right side in FIG. 2). The lower end side of the sensor element 20 corresponds to an example of "one end side" of the present invention, and the upper end side of the sensor element 20 corresponds to "the other end side" of the present invention. The sensor element 20 may include a porous protection layer that covers at least part of a portion of a surface of the multilayer body 20a exposed to the inside of an element chamber 33.

In the multilayer body 20a, a measurement gas circulation portion 21a and a reference gas introduction space 21c are formed. The measurement gas circulation portion 21a allows the measurement-object gas to be introduced and circulate through the inside. The reference gas introduction space 21c allows a reference gas serving as a reference for detection of the specific gas concentration (in this embodiment, the air) to be introduced and circulate through the inside. The measurement gas circulation portion 21a has a measurement gas inlet 22a formed at the distal end surface 20b and serving as an inlet for the measurement-object gas. The measurement gas circulation portion 21a is a space formed from the measurement gas inlet 22a to the upper side (right side in FIG. 2). The measurement gas inlet 22a is located in the element chamber 33 which is a space at the inner side of an inner protection cover 31 (see FIG. 1). A plurality of diffusion-rate controlling portions 21b (three in FIG. 2) for applying a predetermined diffusion resistance to the measurement-object gas are disposed in the middle of the measurement gas circulation portion 21a. The diffusion-rate controlling portions 21b are portions of the multilayer body 20a, and apply the predetermined diffusion resistance to the measurement-object gas by decreasing the circulation area of the measurement-object gas in the measurement gas circulation portion 21a. The reference gas introduction space 21c has a reference gas inlet 22b formed at the proximal end surface 20c and serving as an inlet for the reference gas. The reference gas inlet 22b is located in the space 49 at the inner side of the outer cylinder 48 (see FIG. 1). A porous reference gas introduction layer 21d is disposed in the multilayer body 20a. Part of the reference gas introduction layer 21d is exposed to the reference gas introduction space 21c. The reference gas introduction layer 21d covers a reference electrode 28.

The detector 23 includes at least one electrode. The detector 23 is located in the element chamber 33, and detects the specific gas concentration in the measurement-object gas in the element chamber 33. In this embodiment, the detector 23 includes an outer electrode 24 disposed at a left surface (upper surface in FIG. 2) of the multilayer body 20a; and an inner main pump electrode 25, an inner auxiliary pump electrode 26, a measurement electrode 27, and a reference electrode 28 disposed in the multilayer body 20a. The measurement-object gas in the element chamber 33 reaches the outer electrode 24 and the measurement gas inlet 22a. The measurement-object gas introduced through the measurement gas inlet 22a to the measurement gas circulation portion 21a reaches the inner main pump electrode 25, the inner auxiliary pump electrode 26, and the measurement electrode 27 in that order. The reference gas in the space 49 reaches the reference gas inlet 22b. The reference gas introduced through the reference gas inlet 22b to the reference gas introduction space 21c passes inside the reference gas introduction layer 21d and reaches the reference electrode 28.

The principle that the detector 23 detects the specific gas concentration in the measurement-object gas is known and hence the detailed description on the principle is omitted. For example, the detector 23 detects the specific gas concentration as follows. The detector 23 pumps out oxygen in the measurement-object gas in the periphery of the inner main pump electrode 25 to the outside (the element chamber 33) or pumps in the oxygen from the outside (the element chamber 33), on the basis of the voltage applied between the outer electrode 24 and the inner main pump electrode 25. Also, the detector 23 pumps out the oxygen in the v in the periphery of the inner auxiliary pump electrode 26 to the outside (the element chamber 33) or pumps in the oxygen from the outside (the element chamber 33), on the basis of the voltage applied between the outer electrode 24 and the inner auxiliary pump electrode 26. Accordingly, the measurement-object gas after the oxygen concentration is adjusted to a predetermined value reaches the periphery of the measurement electrode 27. The measurement electrode 27 functions as an NOx reduction catalyst, and reduces the specific gas (NOx) in the reaching measurement-object gas. Then, the detector 23 generates, as an electric signal, an electromotive force generated between the measurement electrode 27 and the reference electrode 28 in accordance with the oxygen concentration after the reduction, or current based on the electromotive force. The electric signal generated by the detector 23 as described above is a signal indicative of a value corresponding to the specific gas concentration in the measurement-object gas (a value from which the specific gas concentration can be derived), and corresponds to the detection value detected by the detector 23. Also, the electric signal is output to the outside via a conductive electrode (not illustrated) disposed on a surface at the upper end side (right side in FIG. 2) of the sensor element 20.

The heater 29 is an electrical resistor disposed in the multilayer body 20a. The heater 29 is supplied with electricity from the outside, hence generates heat, and heats the multilayer body 20a. The heater 29 heats the solid electrolyte layers forming the multilayer body 20a and keeps the heat, and thus can adjust the temperature to a temperature at which the solid electrolyte layers are activated (for example, 800° C.)

As illustrated in FIG. 1, the protection cover 30 includes the inner protection cover 31 having a bottomed cylindrical shape that covers the one end side (in this case, lower end side) of the sensor element 20, and an outer protection cover 32 having a bottomed cylindrical shape that covers the inner protection cover 31. A plurality of holes are formed in the inner protection cover 31 and the outer protection cover 32. The holes allow the measurement-object gas to circulate in the protection cover 30. The element chamber 33 is formed as a space surrounded by the inner protection cover 31. The distal end surface 20b of the sensor element 20 is arranged in the element chamber 33. The protection cover 30 is welded to a main metal fitting 42. The protection cover 30 is made of an alloy containing at least Fe and Cr. A more specific material of the protection cover 30 may be stainless steel, such as a Cr—Ni—Fe-based alloy (SUS301, SUS304, SUS310, etc.).

The element sealing body 40 is a member that seals and fixes the sensor element 20. The element sealing body 40 includes a cylindrical body 41 including the main metal fitting 42 and an inner cylinder 43; supporters 44a to 44c; sealants 45a and 45b; and a metal ring 46. The sensor element 20 is located on the central axis of the element sealing body 40, and penetrates through the element sealing body 40 in the up-down direction.

The main metal fitting 42 is a cylindrical metal member. A portion at the lower side of the main metal fitting 42 is a thick portion 42a having a smaller inner diameter than that of the upper side. Also, a flange portion 42c is formed on an outer peripheral surface of the main metal fitting 42. The protection cover 30 is attached to the main metal fitting 42 at the same side as the one end of the sensor element 20 (in this case, lower side). A lower surface of the flange portion 42c contacts an upper end of the protection cover 30 (in this case, upper end of the inner protection cover 31). An upper end of the main metal fitting 42 is welded to a lower end of the inner cylinder 43. The thick portion 42a has a smaller inner diameter than that of the upper side of the main metal fitting 42. Hence a portion of an inner peripheral surface of the thick portion 42a serves as a bottom surface 42b which is a step surface. The bottom surface 42b presses the supporter 44a so that the supporter 44a does not protrude out to the lower side in FIG. 1. The lower surface of the flange portion 42c is welded to an upper end of the outer protection cover 32. Also, the main metal fitting 42 has a weld portion 42d on the outer peripheral surface of the main metal fitting 42, at a position above the flange portion 42c. The metal main fitting 42 is welded to the outer cylinder 48 at the weld portion 42d. The material of the main metal fitting 42 is a stainless steel of, for example, a Cr—Fe-based alloy (for example, SUS430).

The inner cylinder 43 is a cylindrical metal member thinner than the main metal fitting 42. The inner cylinder 43 has a flange portion 43a at the lower end of the inner cylinder 43, and an expanded pipe portion 43b at an upper end of the inner cylinder 43. The inner diameter of the expanded pipe portion 43b increases toward a distal end thereof. The inner cylinder 43 is attached to the main metal fitting 42 at the same side as the other end of the sensor element 20 (in this case, upper side). A lower surface of the flange portion 43a of the inner cylinder 43 is welded to the main metal fitting 42. The inner cylinder 43 and the main metal fitting 42 are coaxially welded and fixed. Also, the inner cylinder 43 has a reduced-diameter portion 43c for pressing the sealant 45b in a direction toward the central axis of the inner cylinder 43, and a reduced-diameter portion 43d for pressing the supporters 44a to 44c and the sealants 45a and 45b downward in FIG. 1 via the metal ring 46. The inner diameter of a portion of the inner cylinder 43 other than the flange portion 43a, the expanded pipe portion 43b, and the reduced-diameter portions 43c and 43d is substantially the same as the inner diameter of a portion of the main metal fitting 42 other than the thick portion 42a. The material of the inner cylinder 43 is a stainless steel of, for example, a Cr—Fe-based alloy (for example, SUS430).

The supporters 44a to 44c and the sealants 45a and 45b are arranged between an inner peripheral surface of the cylindrical body 41 and the sensor element 20. The supporters 44a to 44c are members made of ceramics, for example, alumina, steatite, zirconia, or spinel. The sealants 45a and 45b are, for example, green compacts formed by shaping powder. The material of the green compacts may be talc, or ceramic powder, such as alumina powder or boron nitride. The sealants 45a and 45b may each contain at least one of these. The area between the supporters 44a and 44b is filled with the sealant 45a. The sealant 45a is sandwiched and pressed by the supporters 44a and 44b from both sides (upper and lower sides). The area between the supporters 44b and 44c is filled with the sealant 45b. The sealant 45b is sandwiched and pressed by the supporters 44b and 44c from both sides (upper and lower sides). The supporters 44a to 44c and the sealants 45a and 45b are sandwiched and pressed from the upper and lower sides by a set of the reduced-diameter portion 43d and the metal ring 46, and the bottom surface 42b of the thick portion 42a of the main metal fitting 42. With the pressing forces from the reduced-diameter portions 43c and 43d, the sealants 45a and 45b are compressed between the cylindrical body 41 and the sensor element 20. Hence, the sealants 45a and 45b provide sealing between the element chamber 33 in the protection cover 30 and the space 49 in the outer cylinder 48, and fix the sensor element 20.

The nut 47 is fixed to the outer side of the main metal fitting 42 coaxially with the main metal fitting 42. The nut 47 has an external thread portion on an outer peripheral surface of the nut 47. The external thread portion is inserted into a fixture member 71 that is welded to the pipe 70 and that has an internal thread portion on an inner peripheral surface of the fixture member 71. Accordingly, the gas sensor 10 can be fixed to the pipe 70 in a state in which the lower end side of the sensor element 20 and the portion of the protection cover 30 of the gas sensor 10 protrude into the pipe 70.

The outer cylinder 48 is a cylindrical metal member. The outer cylinder 48 covers the inner cylinder 43, the upper end side of the sensor element 20, and the connector 50. An upper portion of the main metal fitting 42 is inserted into the outer cylinder 48. A lower end of the outer cylinder 48 is welded to the weld portion 42d of the main metal fitting 42. A plurality of lead wires 55 connected to the connector 50 are extended outside from an upper end of the outer cylinder 48. The connector 50 contacts a conduction electrode (not illustrated) disposed on a surface at the upper end side (left and right surfaces) of the sensor element 20 and is electrically connected to the conduction electrode. The lead wires 55 are electrically connected to the respective electrodes 24 to 28 and the heater 29 in the sensor element 20 via the connector 50. The gap between the outer cylinder 48 and the lead wires 55 is sealed with the rubber cap 57. The space 49 in the outer cylinder 48 is filled with the reference gas. The upper end side of the sensor element 20 is arranged in the space 49. The outer cylinder 48 also has a role of protecting the upper end side of the sensor element 20.

Next, an example of a method of manufacturing the gas sensor 10 configured as described above is described below. The method of manufacturing the gas sensor 10 according to this embodiment includes:

(a) a step of preparing the assembly 15 including the sensor element 20 that has the measurement gas inlet 22a for introducing the measurement-object gas at the one end side (in this case, lower end side) of the sensor element 20 and that detects the specific gas concentration in the introduced measurement-object gas, the metal cylindrical body 41 through which the sensor element 20 penetrates in the axial direction, and the protection cover 30 that is attached to the cylindrical body 41 and that covers the one end side of the sensor element 20; and (b) a step of arranging a coil at least the portion of the cylindrical body 41 at the same side as the other end (in this case, upper side) of the sensor element 20 with respect to the protection cover 30 to avoid the protection cover 30 of the assembly 15, induction heating the portion of the cylindrical body 41 where the coil is arranged in the periphery by applying current to the coil, and removing oil adhering to the portion.

The step (a) is described first. In the step (a), the assembly 15 which has been fabricated in advance may be prepared, or the assembly 15 may be fabricated and hence prepared. The case of fabricating the assembly 15 is described below. FIG. 3A to 3E provide section views schematically illustrating a manufacturing process of the assembly 15.

Figure 3:
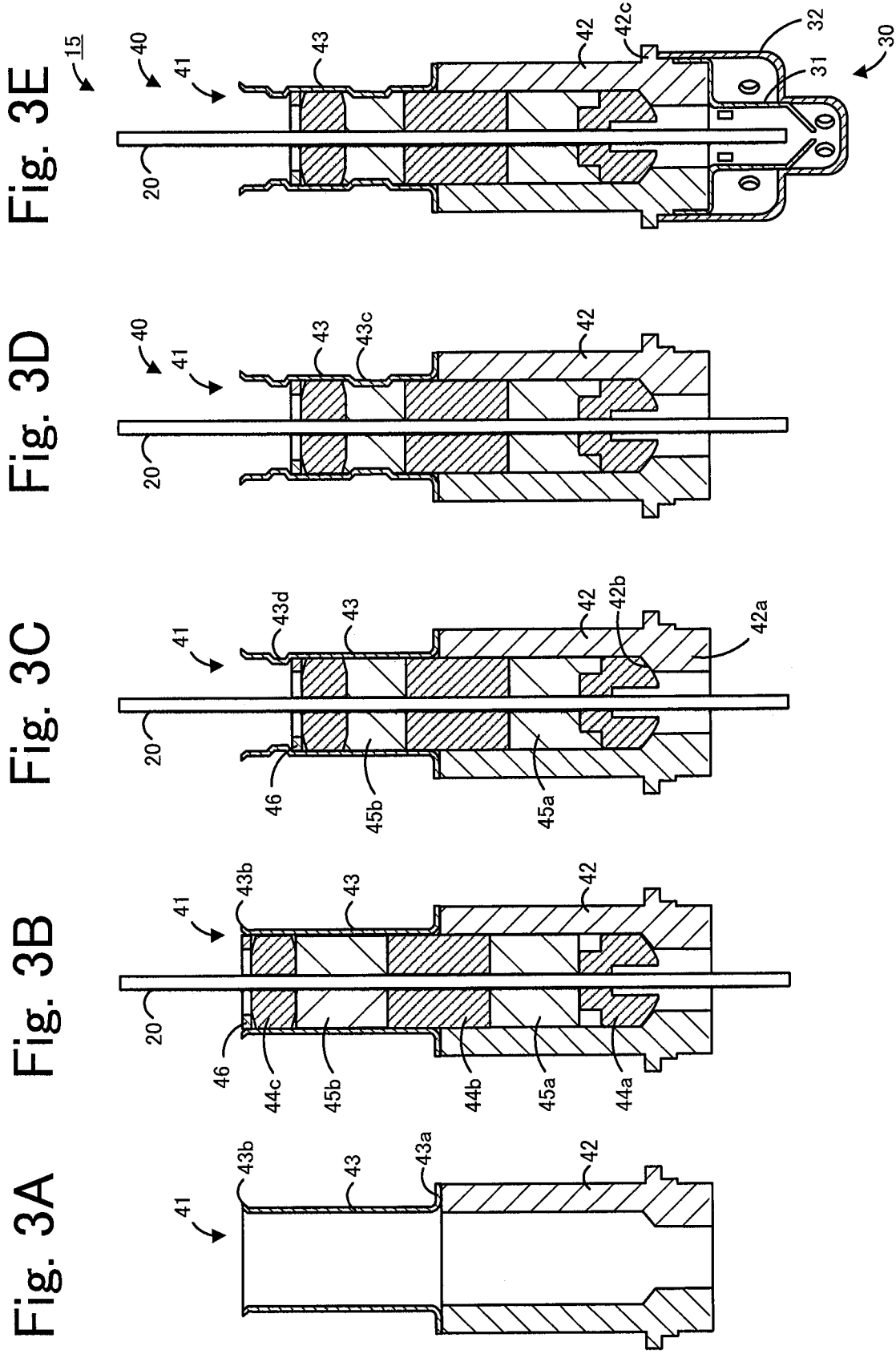
FIG. 3A to 3E provide section views schematically illustrating a manufacturing process of an assembly 15.

In the step (a), the main metal fitting 42 and the inner cylinder 43 are prepared and welded to each other to form the cylindrical body 41 (FIG. 3A). The main metal fitting 42 and the inner cylinder 43 may be manufactured, for example, by forging. At this time, the flange portion 43a and the expanded pipe portion 43b are already formed at the inner cylinder 43, but the reduced-diameter portions 43c and 43d are not formed yet at the inner cylinder 43. The main metal fitting 42 and the inner cylinder 43 are welded to one another, for example, by resistance welding. Specifically, the main metal fitting 42 and the inner cylinder 43 are welded to one another by resistance welding, by coaxially mating the upper end of the main metal fitting 42 and the flange portion 43a of the inner cylinder 43 with one another by using a jig (not illustrated), and applying current to the contact surfaces. Accordingly, the main metal fitting 42 and the inner cylinder 43 are welded to one another at the contact surfaces, and form the cylindrical body 41.

Then, the sensor element 20 is inserted to penetrate through the metal ring 46, the supporter 44c, the sealant 45b, the supporter 44b, the sealant 45a, and the supporter 44a in that order, and the resultant is inserted into the cylindrical body 41 from the expanded pipe portion 43b side of the inner cylinder 43 (FIG. 3B). The insertion is performed by using a jig so that the central axis of the cylindrical body 41 is aligned with the central axis of the sensor element 20 with reference to the outer diameter of the cylindrical body 41. The sensor element 20 can be fabricated by a known method. For example, a plurality of unfired ceramic green sheets containing an oxygen-ion-conductive solid electrolyte such as zirconia as a ceramic component are prepared, and various patterns of electrodes etc. are formed on the ceramic green sheets. By stacking and bonding the plurality of ceramic green sheets, then cutting the ceramic green sheets to obtain an unfired body having the size of the sensor element 20, and firing the unfired body, the sensor element 20 is obtained. Holes are made in advance in the metal ring 46, the supporters 44a to 44c, and the sealants 45a and 45b along the central axis to allow the sensor element 20 to penetrate therethrough.

Then, the metal ring 46 and the main metal fitting 42 are pressed toward one another and hence the sealants 45a and 45b are compressed. Accordingly, the area between the inner peripheral surface of the cylindrical body 41 and the sensor element 20 is sealed. Then, in this state, the expanded pipe portion 43b side of the inner cylinder 43 with respect to the metal ring 46 is swaged and hence the reduced-diameter portion 43d is formed (FIG. 3C). Accordingly, the pressing force between the set of the reduced-diameter portion 43d and the metal ring 46, and the bottom surface 42b of the main metal fitting 42 is kept.

Then, a portion of the inner cylinder 43 located at a side surface of the sealant 45b is swaged and hence the reduced-diameter portion 43c is formed. Thus, the element sealing body 40 is fabricated (FIG. 3D). Since the reduced-diameter portion 43c is formed, the inside of the inner cylinder 43 is further reliably sealed and the sensor element 20 is further reliably fixed. Then, the inner protection cover 31 and the outer protection cover 32 are welded as the protection cover 30 to the lower side of the main metal fitting 42, and hence the assembly 15 is obtained (FIG. 3E). The welding of the protection cover 30 is performed, for example, by laser welding.

After the assembly 15 is prepared by performing the step (a) as described above, the oil adhering to at least the portion of the cylindrical body 41 of the assembly 15 is removed by performing the step (b), and then the nut 47 is attached to the main metal fitting 42. The lead wires 55 inserted through the rubber cap 57 and the connector 50 connected to the lead wires 55 are prepared, and the connector 50 is connected to the other end side (in this case, upper end side) of the sensor element 20. Then, the lead wires 55, the rubber cap 57, the connector 50, and the upper side of the assembly 15 are inserted into the outer cylinder 48, the lower end of the outer cylinder 48 is welded and fixed to the weld portion 42d of the main metal fitting 42, and hence the gas sensor 10 illustrated in FIGS. 1 and 2 is obtained. The welding of the outer cylinder 48 is performed, for example, by laser welding.

Figure 4:
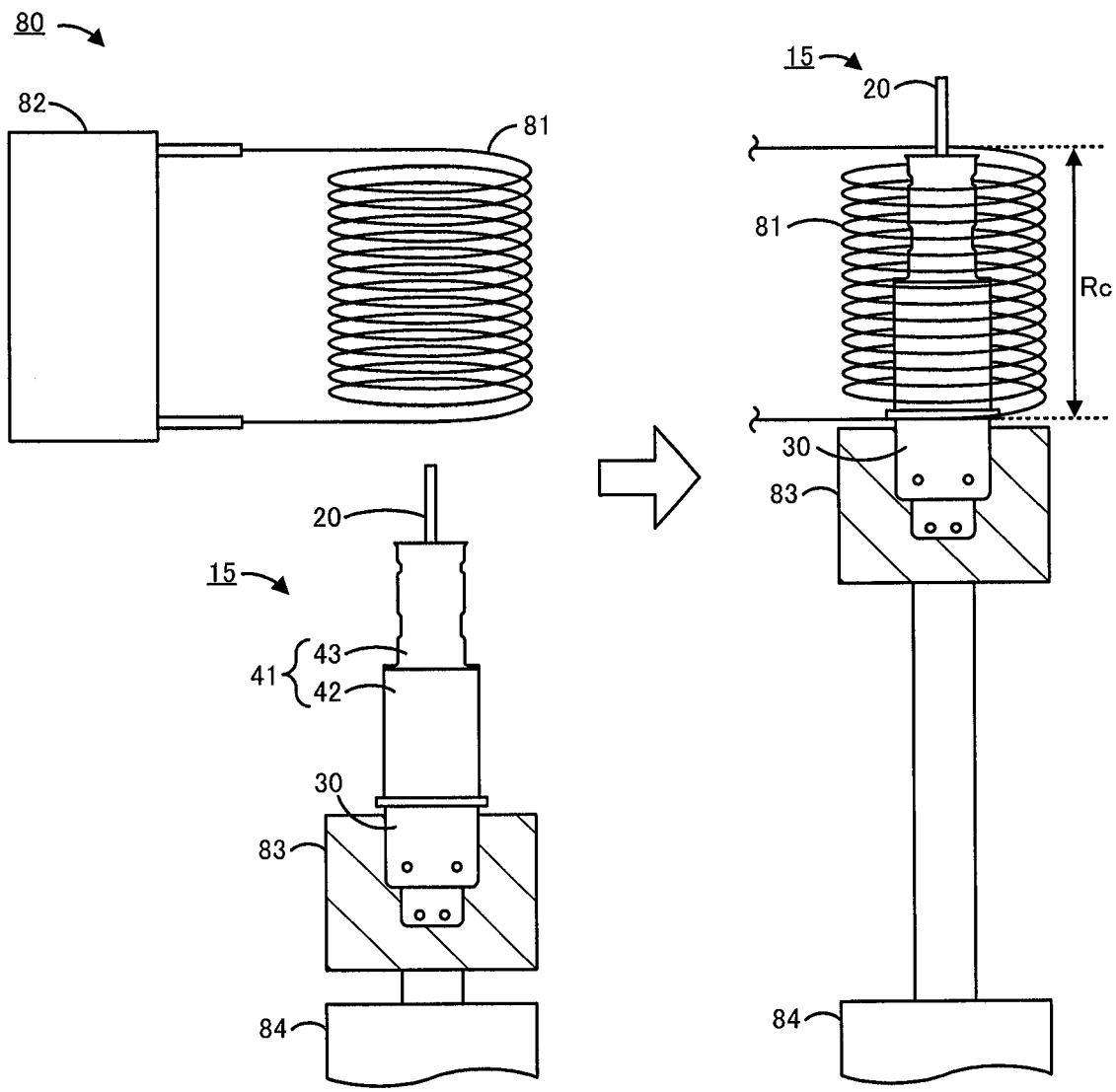
FIG. 4 is an explanatory view illustrating a state in which the assembly 15 is induction heated by using an induction heating device 80.
Figure 5:
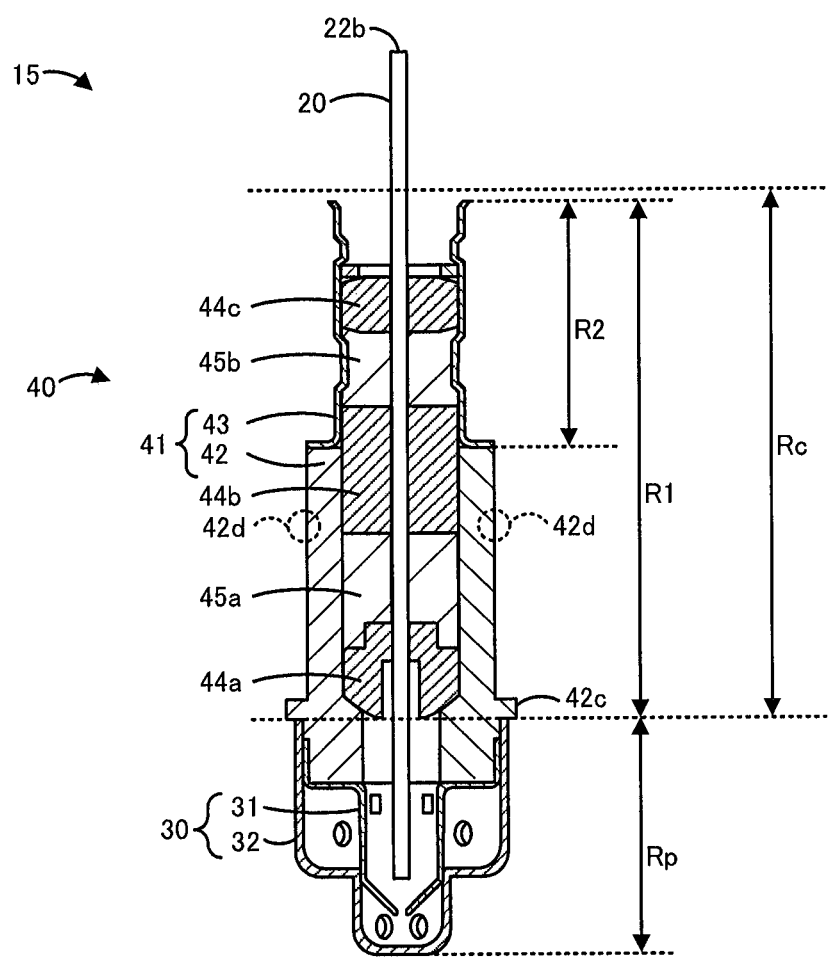
FIG. 5 is an explanatory view of a positional relationship between a coil arrangement region Rc and the assembly 15.

The step (b) is described below in detail. The induction heating in the step (b) is performed by applying current to the coil arranged in the periphery of the assembly 15. In this embodiment, the induction heating is performed on the assembly 15 by using an induction heating device 80 illustrated in FIG. 4. The left side in FIG. 4 is an explanatory view of a state before a coil 81 is arranged in the periphery of the assembly 15. The right side in FIG. 4 is an explanatory view of a state in which the coil 81 is arranged in the periphery of the assembly 15 and the induction heating is performed. FIG. 5 is an explanatory view of a positional relationship between a coil arrangement region Rc and the assembly 15. As illustrated in the left in FIG. 4, the induction heating device 80 includes the coil 81, a power supply unit 82 that is an alternating-current power supply and applies current to the coil 81, a support 83 that is arranged below the coil 81 and supports and fixes the assembly 15, and an elevating and lowering portion 84 that moves up and down the support 83. In the step (b), the assembly 15 is attached to the support 83 (left in FIG. 4), and the assembly 15 is moved up by the elevating and lowering portion 84 to a predetermined height (right in FIG. 4). Accordingly, at least a portion of the cylindrical body 41 of the assembly 15 is inserted into the coil 81. In this state, the power supply unit 82 applies current to the coil 81, and hence induction heats at least the portion of the cylindrical body 41 of the assembly 15. In the step (b), the assembly 15 may be cooled after the heating, for example, by natural cooling or by applying a refrigerant such as the air.

The positional relationship between the coil 81 and the assembly 15 during the induction heating is described with reference to FIGS. 4 and 5. In the step (b), when the assembly 15 is moved up and the coil 81 is arranged in the periphery of the assembly 15, the coil 81 is arranged to avoid the protection cover 30. That is, when a region extending from an upper end to a lower end of the coil 81 illustrated in the right in FIG. 4 is defined as a coil arrangement region Rc and a region extending from an upper end to a lower end of the protection cover 30 illustrated in FIG. 5 is defined as a protection cover region Rp, the coil 81 is arranged so that the coil arrangement region Rc (also illustrated in FIG. 5) does not overlap the protection cover region Rp. Also, the coil 81 is arranged in the periphery of at least a portion of the cylindrical body 41 at the same side as the upper end of the sensor element 20 with respect to the protection cover 30. That is, when a region of the cylindrical body 41 illustrated in FIG. 5 at the upper side with respect to the upper end of the protection cover 30 is defined as a region R1, the coil 81 is arranged so that the coil arrangement region Rc overlaps at least a portion of the region R1. In this embodiment, the region R1 is a region extending from the lower surface of the flange portion 42c to the upper end of the inner cylinder 43. The coil arrangement region Rc may include at least a portion of the sensor element 20 at the other end side (in this case, upper end side) of the sensor element 20 with respect to the region R1, or may include the entirety of the sensor element 20 at the other end side with respect to the region R1.

As described above, in the step (b) of this embodiment, the coil 81 is arranged so that the coil arrangement region Rc does not overlap the protection cover region Rp and overlaps at least the portion of the region R1, and the induction heating is performed. Accordingly, the portion of the cylindrical body 41 where the coil is arranged in the periphery (in this case, the portion of the cylindrical body 41 included in the coil arrangement region Rc) is induction heated, and oil of this portion is removed. The oil adhering to the cylindrical body 41 is, for example, lubricating oil, cutting oil, grinding oil, etc. If the oil adheres to the cylindrical body 41, the oil may be gasified when the gas sensor 10 is used, and the gasified oil may be mixed to the measurement-object gas in the element chamber 33 or may be mixed to the reference gas in the space 49. Hence, the detection accuracy for the NOx concentration by the gas sensor 10 may be decreased. By removing at least part of the oil adhering to the cylindrical body 41 by performing the induction heating in the step (b), the decrease in the detection accuracy of the gas sensor 10 can be restricted. Also, since the coil 81 is not arranged in the periphery of the protection cover 30 and the protection cover 30 is unlikely induction heated, blackening of the protection cover 30 can be suppressed. The protection cover 30 is blackened possibly because of an oxidized film generated when a component of at least one of Cr and Fe contained in the protection cover 30 is oxidized by being heated. If the protection cover 30 is blackened, the protection cover 30 likely absorbs radiant heat. The time required for raising the temperature of the sensor element 20 by the heater 29 at the start of use of the sensor element 20 may be increased, and the responsiveness at the start of use of the sensor element 20 may be decreased. That is, in the gas sensor 10, the time required from when the rise in temperature of the sensor element 20 by the heater 29 is started in use to when the NOx concentration can be correctly detected (also called light off time) may be increased. By suppressing blackening of the protection cover 30, a variation in light off time during manufacturing of the gas sensor 10 can be suppressed.

In the step (b), the coil 81 is preferably arranged in the periphery of the portion of the cylindrical body 41 including at least the inner cylinder 43. That is, when a region extending from the upper end to the lower end of the inner cylinder 43 illustrated in FIG. 5 is defined as a region R2, the coil 81 is preferably arranged so that the coil arrangement region Rc includes the region R2. In this case, in the gas sensor 10, if oil adheres to the inner cylinder 43 of the cylindrical body 41 located at the same side as the other end of the sensor element 20 with respect to the main metal fitting 42, that is, located at a side near the reference gas inlet 22b, the gasified oil reaches the reference gas inlet 22b and hence likely decreases the detection accuracy for the NOx concentration. In the step (b), by arranging the coil 81 so that the coil arrangement region Rc includes the region R2 and performing the induction heating, the oil of at least the inner cylinder 43 of the cylindrical body 41 can be removed. Hence, the decrease in the detection accuracy due to the oil adhering to the inner cylinder 43 can be suppressed. In particular, in this embodiment, only the inner cylinder 43 among components of the cylindrical body 41 faces the space 49 as illustrated in FIG. 1. Hence, by removing the oil of the inner cylinder 43, the phenomenon in which the oil adhering to the cylindrical body 41 is gasified and reaches the reference gas inlet 22b almost does not occur.

In the step (b), the coil 81 may be arranged in the periphery of the entirety of the cylindrical body 41 at the same side as the other end (in this case, upper side) of the sensor element 20 with respect to the protection cover 30. That is, the coil 81 may be arranged so that the coil arrangement region Rc includes the region R1. The coil arrangement region Rc illustrated in FIG. 5 represents an example in a case where the coil 81 is arranged so that the coil arrangement region Rc includes the region R1. Accordingly, a large portion as possible of the cylindrical body 41 can be induction heated while the protection cover 30 is avoided, and hence the oil adhering to the cylindrical body 41 is likely removed.

In the step (b), the portion of the cylindrical body 41 included in the coil arrangement region Rc is preferably heated at 420° C. or higher. Accordingly, the oil of the portion of the cylindrical body 41 where the coil 81 is arranged in the periphery can be further reliably removed. The portion of the cylindrical body 41 included in the coil arrangement region Rc may be heated at 600° C. or higher. The temperature of the portion of the cylindrical body 41 included in the coil arrangement region Rc may be set so as not to exceed 650° C.

In the step (b), the induction heating may be performed so that the temperatures of the sealants 45a and 45b do not exceed 650° C. In particular, if the sealants 45a and 45b contain talc, it is preferable to set the temperatures of the sealants 45a and 45b so as not to exceed 650° C., because deterioration of the talc by the induction heating can be suppressed. For example, if the sealant 45a contains talc, the talc is fired and hence contracted when the temperature of the talc becomes 650° C. or higher. A gap may be generated in the sealant 45a and the sealing between the inner peripheral surface of the cylindrical body 41 and the sensor element 20 may be weakened. This can be suppressed by setting the temperatures of the sealants 45a and 45b so as not to exceed 650° C.

In the step (b), the temperature of the portion of the cylindrical body 41 included in the coil arrangement region Rc is preferably raised to 400° C. or higher, and a temperature rise rate when the temperature of the portion is 400° C. or higher is preferably set so as not to exceed 27.5° C./second. Accordingly, generation of a crack in the supporters 44a to 44c which are the ceramic members by a sudden temperature rise can be suppressed.

In the step (b), the temperature of the portion of the cylindrical body 41 included in the coil arrangement region Rc may be raised to 400° C. or higher, and a temperature rise rate when the temperature of the portion is lower than 400° C. may be set at a predetermined value or smaller. The predetermined value may be, for example, 40° C./second or may be 38.5° C./second.

In the step (b), the temperature of the portion of the cylindrical body 41 included in the coil arrangement region Rc may be raised to 600° C. or higher, and a temperature rise rate when the temperature of the portion is in a range from 400° C. or higher to 600° C. or lower is preferably set so as not to exceed 27.5° C./second. Accordingly, generation of a crack in the supporters 44a to 44c which are the ceramic members by a sudden temperature rise can be suppressed.

In the step (b), the coil 81 may be arranged to avoid a portion of the cylindrical body 41 to be welded after the step (b). For example, the coil 81 may be arranged above the weld portion 42d or the coil 81 may be arranged below the weld portion 42d so that the weld portion 42d of the cylindrical body 41 is not included in the coil arrangement region Rc. The induction heating device 80 may include a plurality of coils, and a coil may be arranged in the periphery of the cylindrical body 41 at a position above the weld portion 42d and a coil may be arranged in the periphery of the cylindrical body 41 at a position below the weld portion 42d. If the portion to be welded of the cylindrical body 41 after the step (b) is included in the coil arrangement region Rc, an oxidized film may be generated at the portion by the induction heating. The oxidized film may cause a weld defect when welding is performed after the step (b). By arranging the coil 81 to avoid the portion of the cylindrical body 41 to be welded after the step (b), occurrence of a weld defect can be suppressed.

In the step (b), moisture is preferably removed by heating from at least one of the sealants 45a and 45b. If the sealants 45a and 45b contain moisture, the moisture is evaporated and affects the oxygen concentration of the reference gas in the space 49 and hence the detection accuracy for the NOx concentration by the gas sensor 10 may be decreased. By removing the moisture of the sealants 45a and 45b, such a decrease in the detection accuracy can be suppressed. In particular, the moisture is preferably removed in the step (b) from the sealant 45b close to the space 49 among the sealants 45a and 45b.

In the step (b), the induction heating is preferably performed so that the temperature of the protection cover 30 does not exceed 500° C. When the cylindrical body 41 is induction heated, the protection cover 30 may be also heated, for example, by thermal conduction. However, by keeping the temperature of the protection cover 30 during the induction heating to be lower than 500° C., blackening of the protection cover 30 can be further reliably suppressed. The temperature of the protection cover 30 during the induction heating may be adjusted, for example, by adjusting one or more of the value of current to be applied to the coil 81, the frequency of current, and the distance in the up-down direction between the protection cover 30 and the coil 81. Alternatively, the temperature of the protection cover 30 may be adjusted, for example, by cooling the protection cover 30 by applying a cooling gas such as the air to the protection cover. Also, the protection cover 30 is preferably cleaned and the oil is preferably removed before the protection cover 30 is attached to the main metal fitting 42 in the step (a).

With the method of manufacturing the gas sensor 10 according to this embodiment described above in detail, when the assembly 15 is induction heated in the step (b), the coil 81 is arranged in the periphery of at least the portion of the cylindrical body 41 at the upper side with respect to the protection cover 30 to avoid the protection cover 30. Then, by applying current to the coil 81, the portion of the cylindrical body 41 where the coil 81 is arranged in the periphery is induction heated. Hence, the oil of the induction-heated portion of the cylindrical body 41 is removed, and blackening of the protection cover 30 can be suppressed.

Also, in the step (b), since the coil 81 is arranged in the periphery of the portion of the cylindrical body 41 including at least the inner cylinder 43, by removing the oil of at least the inner cylinder 43, the decrease in the detection accuracy of the gas sensor 10 due to the oil adhering to the inner cylinder 43 can be suppressed. Further, in the step (b), since the coil 81 is arranged in the periphery of the entirety of the cylindrical body 41 at the upper side with respect to the protection cover 30, a large portion as possible of the cylindrical body 41 can be induction heated while the protection cover 30 is avoided, and the oil adhering to the cylindrical body 41 is likely removed. Further, in the step (b), since the portion of the cylindrical body 41 where the coil 81 is arranged in the periphery is heated at 420° C. or higher, the oil of the portion can be further reliably removed. Furthermore, in the step (b), since the induction heating is performed so that the temperatures of the sealants 45a and 45b do not exceed 650° C., if talc is contained in the sealants 45a and 45b, deterioration of the talc due to the induction heating can be suppressed. In the step (b), the temperature of the portion of the cylindrical body 41 where the coil 81 is arranged in the periphery is raised to 400° C. or higher, and a temperature rise rate when the temperature of the portion is 400° C. or higher is set so as not to exceed 27.5° C./second. Hence, generation of a crack in the supporters 44a to 44c which are ceramic members can be suppressed. Furthermore, in the step (b), the temperature of the portion of the cylindrical body 41 where the coil 81 is arranged in the periphery is raised to 600° C. or higher, and the temperature rise rate when the temperature of the portion is in the range from 400° C. or higher to 600° C. or lower is set so as not to exceed 27.5° C./second. Hence, generation of a crack in the supporters 44a to 44c which are the ceramic members can be suppressed.

The present invention is not limited to the above-described embodiment, and may be implemented by various aspects as far as pertaining to the technical scope of the invention.

For example, while the element sealing body 40 includes the three supporters 44a to 44c and the two sealants 45a and 45b in the above-described embodiment, it is only required to provide sealing between the inside of the cylindrical body 41 and the sensor element 20 and to fix the sensor element 20, and the numbers of the supporters 44a to 44c and the sealants 45a and 45b may be appropriately changed. For example, the element sealing body 40 may not include the supporter 44b, and a single sealant may be provided between the supporter 44a and the supporter 44c. Also, members other than the ceramic members and the green compacts may be used as long as sealing can be provided between the inside of the cylindrical body 41 and the sensor element 20 and the sensor element 20 can be fixed. Also, while the cylindrical body 41 is the member obtained by welding the main metal fitting 42 and the inner cylinder 43 to one another according to the above-described embodiment, it is not limited thereto, and the cylindrical body 41 may be a member obtained by integrally forming a member corresponding to the main metal fitting 42 and a member corresponding to the inner cylinder 43.

While the measurement gas inlet 22a is disposed at the distal end surface 20b of the sensor element 20 according to the above-described embodiment, it is not limited thereto, and the measurement gas inlet 22a may be disposed at the one end side (lower end side in FIG. 1) of the sensor element 20. Likewise, the reference gas inlet 22b may be disposed at the other end side (upper end side in FIG. 1) of the sensor element 20 without limiting to the proximal end surface 20c. Also, the sensor element 20 may not have the reference gas introduction space 21c, and instead of this, the reference gas introduction layer 21d may extend from the reference electrode 28 to the proximal end surface 20c. In this case, an end portion of the reference gas introduction layer 21d exposed to the proximal end surface 20c corresponds to the reference gas inlet 22b.

Figure 6:
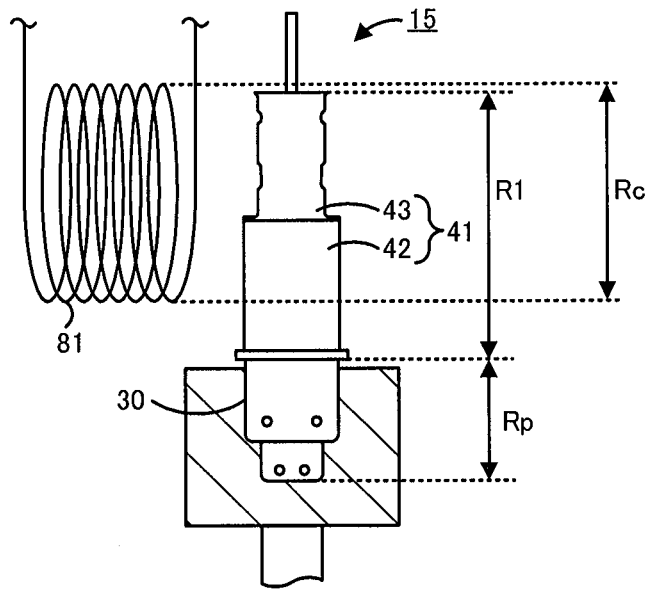
FIG. 6 is an explanatory view illustrating arrangement of a coil 81 according to a modification.

While the induction heating is performed in the state in which at least the portion of the cylindrical body 41 is inserted into the coil 81 in the step (b) according to the above-described embodiment, it is not limited thereto, and it is only required to arrange the coil 81 in the periphery of at least a portion of the cylindrical body 41. For example, as illustrated in FIG. 6, the coil 81 may be arranged in the periphery of the assembly 15 so that the axial direction of the coil 81 intersects with the axial direction of the assembly 15 (in FIG. 6, being orthogonal). Even in this case, when the region extending from the upper end to the lower end of the coil 81 is defined as the coil arrangement region Rc, the coil 81 may be arranged so that the coil arrangement region Rc does not overlap the protection cover region Rp and overlaps at least a portion of the region R1, and the induction heating may be performed. While only one coil 81 is illustrated in FIG. 6, a plurality of coils 81 may be arranged in the periphery of the cylindrical body 41.

EXAMPLES

Examples in which the assembly 15 was fabricated and the induction heating in the step (b) was performed are described below. It is to be noted that the present invention is not limited to the following examples.

Example 1

First, in the step (a), the assembly 15 was fabricated by the procedure described with reference to FIG. 3A to 3E. The material of the main metal fitting 42 was SUS430, the material of the inner cylinder 43 was SUS430, and the material of the protection cover 30 was SUS310S. The supporters 44a to 44c each were a ceramic sintered compact made of alumina. The sealants 45a and 45b each were, for example, a green compact formed by shaping talc powder. Then, in the step (b), the induction heating was performed on the assembly 15 by using the induction heating device 80 illustrated in FIG. 4. The voltage applied by the power supply unit 82 was 12.6 V, the frequency was 172 kHz, and the current applied to the coil 81 was 70.2 A. The time for applying current from the power supply unit 82 was 22 seconds, and the assembly 15 was cooled by sending the air in the periphery of the assembly 15 after the induction heating. The coil 81 was arranged so that the coil arrangement region Rc does not overlap the protection cover region Rp and includes the region R1 as illustrated in FIG. 5.

Example 2

Example 2 was executed by performing the steps (a) and (b) similar to those of Example 1 except that the output of the power supply unit 82 was adjusted so that the current flowing through the coil 81 in the step (b) be 66.0 A.

Figure 7:
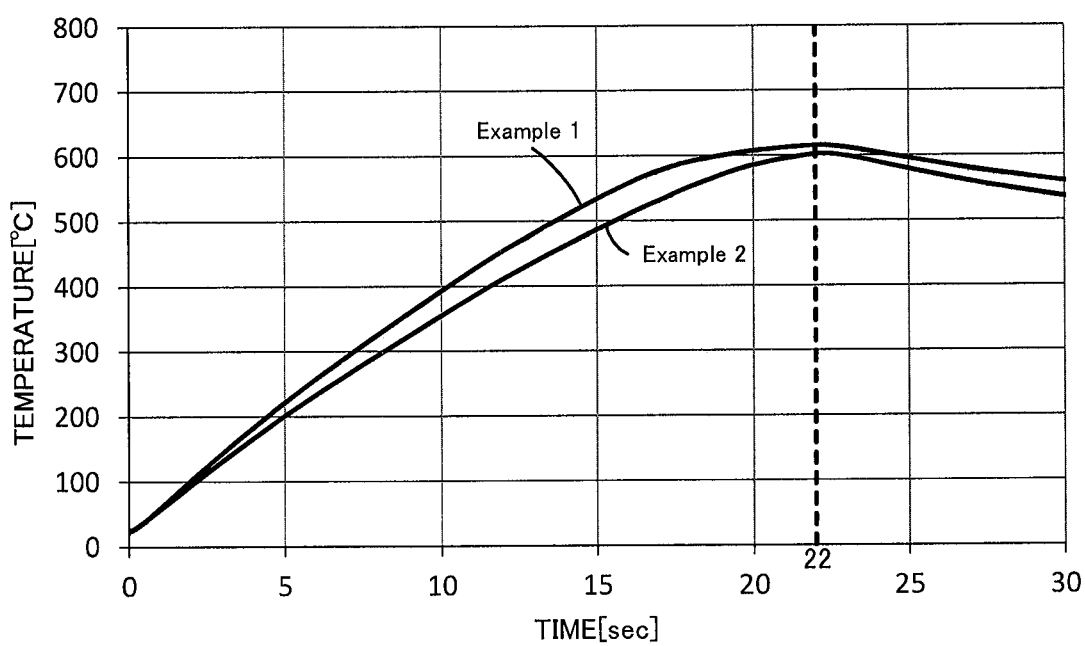
FIG. 7 is a graph showing a change in temperature over time during induction heating according to Example 1 and Example 2.

FIG. 7 is a graph showing a change in temperature over time during induction heating according to Example 1 and Example 2. The horizontal axis in FIG. 7 is the elapsed time since the application of current to the coil 81 is started. The vertical axis in FIG. 7 is the temperature of the cylindrical body 41. The temperature of the cylindrical body 41 was measured by a thermocouple every 0.1 second. In either of Example 1 and Example 2, the cylindrical body 41 was heated by the induction heating to a temperature in a range from 600° C. or higher to 650° C. or lower. In Example 1, the maximum value of the temperature rise rate in a period from when the temperature of the cylindrical body 41 became 400° C. or higher to when the temperature reached the highest temperature was 31.5° C./second. In Example 2, the maximum value of the temperature rise rate in the period from when the temperature of the cylindrical body 41 became 400° C. or higher to when the temperature reaches the highest temperature was 27.5° C./second.

In either of Example 1 and Example 2, blackening of the protection cover 30 was not found. Also, when the fabrication of the assembly 15 and the induction heating according to Example 1 were performed 15 times, a crack was generated in at least one of the supporters 44a to 44c 11 times from among the 15 times. In contrast, in Example 2, a crack was not found in the supporters 44a to 44c at any time of 10 times. With regard to this, it is conceivable that generation of a crack was suppressed in the supporters 44a to 44c by setting the temperature rise rate so as not to exceed 27.5° C./second when the temperature of the portion of the cylindrical body 41 with the coil 81 arranged was 400° C. or higher.

In either of Example 1 and Example 2, when the assembly 15 was inserted into the outer cylinder 48 after the induction heating and the lower end of the outer cylinder 48 was laser welded to the weld portion 42d of the main metal fitting 42, the welding was performed without any problem, and a weld defect was not found. It is conceivable that an oxidized film was not generated at the weld portion 42d under the conditions of the induction heating according to Example 1 and Example 2, or even if an oxidized film was generated, the thickness of the oxidized film was so small that does not affect the welding.

The present application claims priority from Japanese Patent Application No. 2017-053163 filed on Mar. 17, 2017, the entire contents of which are incorporated herein by reference.

What is claimed is:

1. A method of manufacturing a gas sensor, the method comprising:
   (a) a step of preparing an assembly including a sensor element that has a measurement gas inlet for introducing a measurement-object gas at one end side of the sensor element and that detects a specific gas concentration in the introduced measurement-object gas, a metal cylindrical body through which the sensor element penetrates in an axial direction, and a protection cover that is attached to the cylindrical body and that covers the one end side of the sensor element; and
   (b) a step of arranging a coil in a periphery of at least a portion of the cylindrical body to avoid a periphery of the protection cover of the assembly, induction heating the portion of the cylindrical body where the coil is arranged in the periphery by applying current to the coil without blackening the periphery of the protection cover of the assembly, and hence removing oil adhering to the portion,
   (b1) wherein, in the step (b), the portion of the cylindrical body where the coil is arranged in the periphery is heated to 420° C. or higher, and
   (b2) wherein, in the step (b), the induction heating is performed so that the temperature of the protection cover does not exceed 500° C.

2. The method of manufacturing the gas sensor according to claim 1,
   wherein the sensor element has a reference gas inlet through which a reference gas is introduced at an other end side of the sensor element, the reference gas serving as a reference for the detection of the specific gas concentration,
   wherein the cylindrical body includes a main metal fitting and an inner cylinder, the protection cover being attached to the main metal fitting at a same side as the one end of the sensor element, and the inner cylinder being attached to the main metal fitting at a same side as the other end of the sensor element, and
   wherein, in the step (b), the coil is arranged in a periphery of the portion of the cylindrical body including at least the inner cylinder.

3. The method of manufacturing the gas sensor according to claim 1,
   wherein, in the step (b), the coil is arranged in a periphery of an entirety of the cylindrical body at a same side as the other end of the sensor element with respect to the protection cover.

4. The method of manufacturing the gas sensor according to claim 1,
   wherein the assembly includes a sealant containing talc and is arranged between an inner peripheral surface of the cylindrical body and the sensor element, and
   wherein, in the step (b), the induction heating is performed so that a temperature of the sealant does not exceed 650° C.

5. The method of manufacturing the gas sensor according to claim 1,
wherein the assembly includes a ceramic member arranged between the inner peripheral surface of the cylindrical body and the sensor element, and
wherein a temperature rise rate when the temperature of the portion is 420° C. or higher is set so as not to exceed 27.5° C./second.

6. The method of manufacturing the gas sensor according to claim 1,
wherein the assembly includes a ceramic member arranged between the inner peripheral surface of the cylindrical body and the sensor element, and
wherein, in the step (b), a temperature of the portion of the cylindrical body where the coil is arranged in the periphery is raised to 600° C. or higher, and a temperature rise rate when the temperature of the portion is in a range from 420° C. or higher to 600° C. or lower is set so as not to exceed 27.5° C./second.

7. A method of removing oil adhering to an assembly including a sensor element that has a measurement gas inlet for introducing a measurement-object gas at one end side of the sensor element and that detects a specific gas concentration in the introduced measurement-object gas, a metal cylindrical body through which the sensor element penetrates in an axial direction, and a protection cover that is attached to the cylindrical body and that covers the one end side of the sensor element, the method comprising:
a step of arranging a coil in a periphery of at least a portion of the cylindrical body to avoid a periphery of the protection cover of the assembly, induction heating the portion of the cylindrical body where the coil is arranged in the periphery by applying current to the coil without blackening the periphery of the protection cover of the assembly, and hence removing oil adhering to the portion,
wherein the portion of the cylindrical body where the coil is arranged in the periphery is heated to 420° C. or higher, and
wherein, the induction heating is performed so that the temperature of the protection cover does not exceed 500° C.

* * * * *